US009594513B1

(12) United States Patent
Delgado et al.

(10) Patent No.: US 9,594,513 B1
(45) Date of Patent: Mar. 14, 2017

(54) DATA STORAGE SYSTEM WITH FILE SYSTEM STREAM DETECTION

(71) Applicant: EMC Corporation, Hopkinton, MA (US)

(72) Inventors: Diane M. Delgado, Carlisle, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 14/753,450

(22) Filed: Jun. 29, 2015

(51) Int. Cl.
*G06F 3/06* (2006.01)

(52) U.S. Cl.
CPC ............. *G06F 3/061* (2013.01); *G06F 3/064* (2013.01); *G06F 3/0643* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,910,054 B1 | 6/2005 | Herbst et al. | |
| 7,765,378 B1 * | 7/2010 | Georgiev | G06F 3/0608 711/173 |
| 8,407,192 B2 * | 3/2013 | Memon | G06F 3/061 707/693 |
| 8,751,725 B1 * | 6/2014 | Gangadharan | G06F 12/0638 711/100 |
| 9,361,183 B2 * | 6/2016 | Cong | G06F 11/1435 |
| 2003/0208660 A1 * | 11/2003 | van de Waerdt | G06F 12/0862 711/137 |
| 2007/0022148 A1 * | 1/2007 | Akers | G06F 17/30138 |
| 2007/0283086 A1 * | 12/2007 | Bates | G06F 3/0613 711/113 |
| 2013/0311745 A1 * | 11/2013 | Harris | G06F 3/0611 711/171 |
| 2013/0326169 A1 * | 12/2013 | Shaharabany | G06F 12/0253 711/161 |
| 2014/0122796 A1 | 5/2014 | DeKoning | |
| 2015/0277969 A1 * | 10/2015 | Strauss | G06F 9/467 707/703 |
| 2016/0188211 A1 * | 6/2016 | Song | G06F 3/0631 711/114 |

* cited by examiner

*Primary Examiner* — Kaushikkumar Patel
(74) *Attorney, Agent, or Firm* — BainwoodHuang

(57) ABSTRACT

A data storage system includes an internal file system writing file system data to an underlying storage volume. File system data is written as sequential data and non-sequential data, the sequential data stored in dynamically allocated windows having a predetermined number of data blocks. Operation includes stream detection that detects and identifies sequential data by (1) applying nearness detection to identify newly written data blocks as sequential data blocks located within a predetermined address range of previously data blocks, (2) for groups of written data blocks occupying respective single files, maintaining counts of the data blocks identified by the nearness detection as sequential data blocks, and (3) as additional data blocks are newly written to the groups and not identified by the nearness detection as sequential data blocks, performing overrides identifying the additional data blocks as sequential data blocks based on the counts exceeding a predetermined threshold.

20 Claims, 7 Drawing Sheets

DATA STORAGE SYSTEM WITH FILE SYSTEM STREAM DETECTION

BACKGROUND

The invention is related to the field of data storage systems, and in particular to data storage systems employing internal file systems and files for representing host storage objects.

Data storage systems that provide secondary storage of data for host computers may employ internal file systems and files to represent host storage objects such as logical units (LUNs), logical or virtual volumes, host file systems, etc. In such arrangements data may be written in streams of contiguous or address-sequential data blocks. For efficiency, storage space for such data may be allocated in units spanning multiple contiguous blocks, reducing the overhead and delays of the more typical block-by-block allocation used for data written in a more random manner.

SUMMARY

A file system of a data storage system utilizes stream detection to aid in categorizing I/O patterns as sequential or non-sequential, and it allocates storage space for sequential data in multi-block units called "windows". Stream detection interacts with window allocation to identify sequential I/O so that a window can be allocated and filled appropriately to create a desirably long contiguous extent of data blocks. Once a window is allocated for sequential data for an area of the file, subsequent writes in the same area utilize data blocks of the same window, allowing the extent to grow across distinct write operations.

Stream detection may be based on calculating "nearness" of newly written blocks to recently written blocks, i.e., the nearness of the respective block addresses. If a block is within four block addresses of a recently written block, for example, then it is deemed sufficiently "near" to declare the data to be sequential. However, a simple nearness threshold alone may not provide adequate identification of sequential data in some environments, specifically when a file system client employs multiple execution threads executing concurrently to write respective portions of a long sequence of data. Over short intervals concurrent writes may be separated beyond the nearness threshold, which can cause the unnecessary allocation of new windows for data that should be stored in an existing window.

Thus a technique is described for improved stream detection in a file system employing window allocation. The technique uses nearness detection as a first mechanism for identifying sequential data, but employs additional measures to maintain an indication of sequentiality for data that may not satisfy the nearness threshold but nonetheless should be treated as sequential data. The technique can improve the efficiency of window-based allocation especially in environments having multi-threaded file system clients that concurrently write respective portions of a data stream.

In particular, a method is described of operating a data storage system to write file system data of an internal file system to an underlying storage volume. The method includes writing the file system data as sequential data and non-sequential data to the storage volume, the sequential data being stored in windows each having a predetermined number of consecutive data blocks and being allocated dynamically as the sequential data is written. The method further includes detecting and identifying the sequential data in a stream of file system data being written to the storage volume by (1) applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

The predetermined address range may be defined by a threshold nearness value less than a number of concurrent execution threads writing the sequential data blocks. The predetermined threshold can be a predetermined ratio of (1) a count of written data blocks identified by the nearness detection as sequential data blocks and (2) a count of total written data blocks.

By tracking the degree to which a current workload has already been identified as sequential, the technique can intelligently maintain that identification of sequentiality even over short periods where nearness alone might indicate otherwise. This helps avoid unnecessary allocation of new windows and thus improves efficiency of operation.

In some embodiments, the method further includes, for the groups of written data blocks, maintaining respective counts of overrides that have been performed, and for subsequent written data blocks, refraining from performing additional overrides based on the respective counts of overrides exceeding a predetermined override limit. This feature helps protect against the possibility of erroneously identifying a non-sequential workload as sequential.

The counts of sequential writes and of overrides may be stored in respective leaf indirect blocks of respective files of the file system.

In some embodiments, the files of the file system store respective host storage objects selected from a block-type object and a file-type object. The host storage objects may include respective images for virtual computing components selected from virtual machines and virtual desktops.

In some embodiments, the sequential data is being written by a set of multiple execution threads operating in parallel on different parts of a sequential stream and data blocks are written sufficiently out of address order that the nearness threshold is not met for some writes only because other writes by other execution threads have not yet occurred.

In some embodiments, the windows are sub-units of larger contiguous regions, each region being used for only sequential data or for only non-sequential data. An example of a larger contiguous region is a cylinder group.

In another aspect, a data storage system is disclosed that includes processing circuitry, physical storage devices, and interface circuitry coupling the processing circuitry to the physical storage devices. The processing circuitry stores and executes computer program instructions to cause the data storage system to realize a storage volume and associated internal file system, the storage volume realized using physical storage of the physical storage devices. The file system is configured and operative to write file system data as sequential data and non-sequential data to the storage volume, the sequential data being stored in windows each having a predetermined number of consecutive data blocks and being allocated dynamically as the sequential data is written. The file system is further configured and operative to detect and identify the sequential data in a stream of file system data being written to the storage volume by (1)

applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

A data storage system according to this further aspect may incorporate one or more additional features such as discussed above with respect to the disclosed method.

In another aspect, a non-transitory computer-readable storage medium is disclosed that stores computer program instructions. The instructions are executable by processing circuitry of a data storage system to cause the data storage system to perform a method of writing file system data of an internal file system to an underlying storage volume by (A) writing the file system data as sequential data and non-sequential data to the storage volume, the sequential data being stored in windows each having a predetermined number of consecutive data blocks and being allocated dynamically as the sequential data is written, and (B) detecting and identifying the sequential data in a stream of file system data being written to the storage volume by (1) applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

A computer readable storage medium according to this further aspect may incorporate one or more additional features such as discussed above with respect to the disclosed method and data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
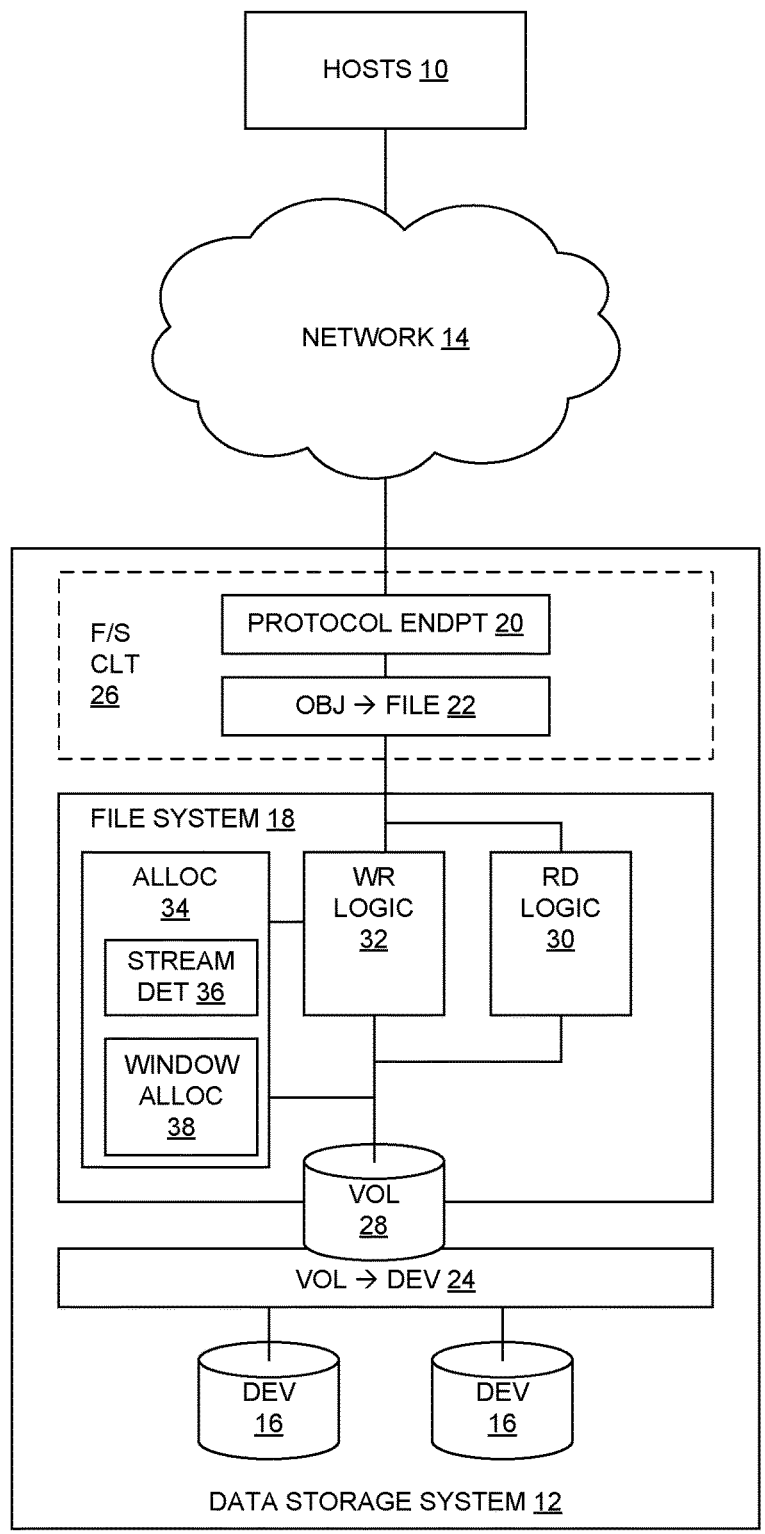
FIG. 1 is a block diagram of a computing system.

FIG. 1 shows a computing system including host computers (HOSTS) 10 coupled to a data storage system 12 by a network 14. In operation, the data storage system 12 provides secondary data storage accessible to the hosts 10 using storage-related input/output (I/O) commands. The hosts 10 send write commands with associated data via the network 14, and the data storage system 12 stores the data on one or more physical, non-volatile storage devices (DEV) 16 such as disk drives, Flash memory arrays, etc. These may be organized into RAID groups to provide redundancy for higher availability performance. The hosts 10 retrieve stored data by sending read commands via the network 14, and the data storage system 12 retrieves the data from the devices 16 and returns the data to the requesting hosts 10. The data storage system 12 may include a semiconductor cache (not shown) that effects a desired decoupling between host commands and the devices 16. Read commands may be satisfied from the cache when the data has previously been prefetched from the devices 16, and write commands may be completed by first storing written data into the cache and later performing a separate destaging operation to move the data from the cache to the devices 16.

The network 14 may be any type of network or combination of networks, such as a storage area network (SAN), a local area network (LAN), a wide area network (WAN), the Internet, and/or other types of network or combinations of networks. The hosts 10 may connect to the data storage system 12 using any of various technologies, such as Fibre Channel, iSCSI, NFS, SMB 3.0, and CIFS, for example. Any number of hosts 14 may be provided, using any of the above protocols, some subset thereof, or other protocols. As is known, Fibre Channel and iSCSI are block-based protocols, whereas NFS, SMB 3.0, and CIFS are file-based protocols.

As shown, the data storage system 12 includes the devices 16 as well as several functional components including an internal file system 18, a protocol endpoint 20, and two mapping layers: an object-file (OBJ→FILE) mapping layer 22 and a volume-device (VOL→DEV) mapping layer 24. At least some components are software-implemented as described below. The protocol endpoint 20 and object-file mapping layer 22 collectively function as a file system client (F/S CLT) 26 of the file system 18. The volume-device mapping layer 24 presents a logical volume (VOL) 28 of storage to the file system 18 using underlying physical storage of the storage devices 16. The file system 18 includes read logic (RD LOGIC) 30, write logic (WR LOGIC) 32, and allocation logic (ALLOC) 34 which includes stream detection (STREAM DET) logic 36 and window allocation (WINDOW ALLOC) logic 38.

A protocol endpoint 20 exposes storage data objects to the hosts 10 in accordance with a respective protocol. Thus, the protocol endpoint 20 may expose block-based objects (e.g., LUNs and block-based virtual volumes or "VVols") using Fiber Channel or iSCSI, or it may expose file-based objects (e.g., host file systems and file-based VVols) using NFS, CIFS, or SMB 3.0, for example. The data storage system 12 may include multiple protocol endpoints 20, which may be of the same type (e.g., all block-based or file-based) or a mixture of types.

The object-file mapping layer 22 maps host-visible data objects, such as host LUNs, host file systems, and VVols, for example, to respective internal files and file systems used to store and manage the object data within the data storage system 12. Thus each host object maps to one or more files of a respective file system 18, and the object-file mapping layer 22 employs file system semantics to access the host object data via the file system 18. As a simple example, a unit of storage exposed to the hosts 10 as a block-oriented LUN is mapped to a file having the same size as the LUN.

When a host 10 accesses the LUN using a block-based protocol over the network 14, the object-file mapping layer 22 translates the access to an access of the file, which is handled by the file system 18. Among other things, the translation involves a translation between a command-specified range of logical block addresses (LBAs) of the LUN to a corresponding range of addresses or "offsets" of the file.

The volume-device mapping 24 maps the logical volume 28, which is visible to the file system 18, to the physical storage provided by the storage devices 16. The volume 28 is a linear array of data blocks. The mapping may be simple or more complex. In one simple example, a single device 16 may be divided into partitions and each partition treated as a volume 28. More typically in larger systems, a set of devices 16 is organized into a RAID group of a given size, and the RAID-based storage is accessed by a volume abstraction. Beyond these straightforward examples, there are myriad other arrangements that include other types of mappings as well as any of a variety of services for enhanced functionality and performance.

The file system 18 uses the write logic 32 and read logic 30 to write and read file system data to/from the volume 28. Certain structure of the file system 18 as stored on the volume 28 is described below. The allocation logic 34 is invoked as necessary during write operations to identify or "allocate" new areas of the volume 28 to store newly written file system data, e.g., data of new files or data being added to a file. The latter case corresponds to a host 10 adding new contents to the corresponding host-visible object to which the file is mapped.

One aspect of operation of the system of FIG. 1 is the presence of "streams" or "sequential data", i.e., adjacent data blocks written in sequence over a relatively brief interval such as a period of several write operations from a host 10. It will be appreciated that a file of the file system 18 may be quite large when storing a large host object such as a LUN. Some host operations may create, move or copy large sections of the host object. As an example, the computing system may implement a virtual-computing infrastructure and manage images for hundreds or thousands of virtual machines, virtual desktops, etc. Operations of the hosts 10 result in series of write operations for such sequences of adjacent data blocks, which are referred to as "sequential data" herein. Other data may be written in a more apparently random fashion, i.e., with a series of write operations directed to a set of widely separated logical block addresses in no particular order. Such data is referred to as "non-sequential" herein.

For sequential data, storage can be allocated from the volume 28 in a more efficient manner than for non-sequential data. When the file system 18 becomes aware that sequential data is being written, it can allocate contiguous multi-block chunks of space with high confidence that the space will be fully or mostly used. This is in contrast to block-by-block allocation, which may be the default allocation paradigm and work well for non-sequential data. Thus the allocation logic 34 includes the stream detection logic 36 for detecting sequential data, as well as window allocation logic 38 that allocates such contiguous multi-blocks chunks, referred to as "windows".

Figure 2:
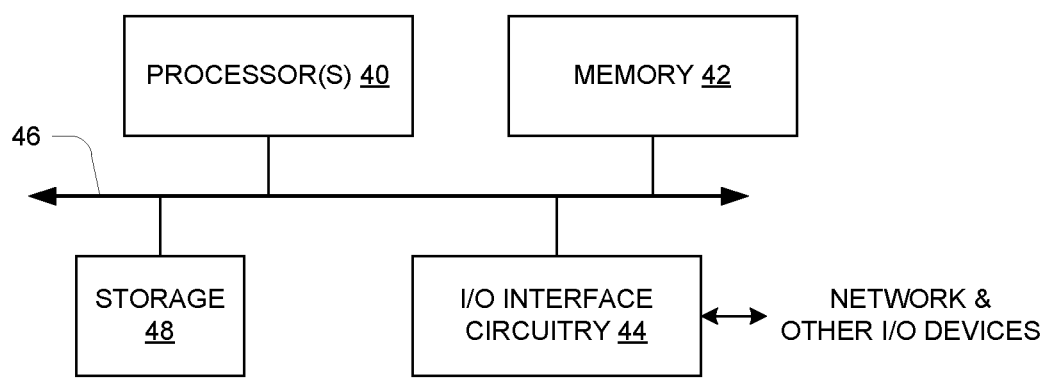
FIG. 2 is a block diagram of computing hardware.

FIG. 2 shows an example configuration of a physical computer or controller from a computer hardware perspective. This arrangement may typify the hosts 10 as well as processing circuitry of the data storage system 12 that executes software to realize the various functional components described above. The computer hardware includes one or more processors 40, memory 42, and interface circuitry 44 interconnected by data interconnections 46 such as one or more high-speed data buses. The processor 40 may be modern multi-core processors having multiple independent execution units referred to as "cores", and it may also utilize low-level multi-threading of code streams for higher computing performance. The interface circuitry 44 provides a hardware connection to an external network (e.g., network 14 of FIG. 1) and perhaps other external devices/connections (EXT DEVs). The processor(s) 40 with connected memory 42 may also be referred to as "processing circuitry" herein. There may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a data storage application, such as described herein, can be referred to as a data storage circuit or data storage component, and it will be understood that a collection of such circuits or components can all be realized and interact with each other as one or more sets of computer processing hardware executing different computer programs as generally known in the art.

Referring again briefly to FIG. 1, either the hosts 10 or the file system client 26 may utilize multiple independent execution threads that result in concurrent accesses to a file of the file system 18. Such multi-threaded access may create certain challenges with respect to detection of sequential data and efficient use and allocation of windows. Details are discussed below.

Figure 3:
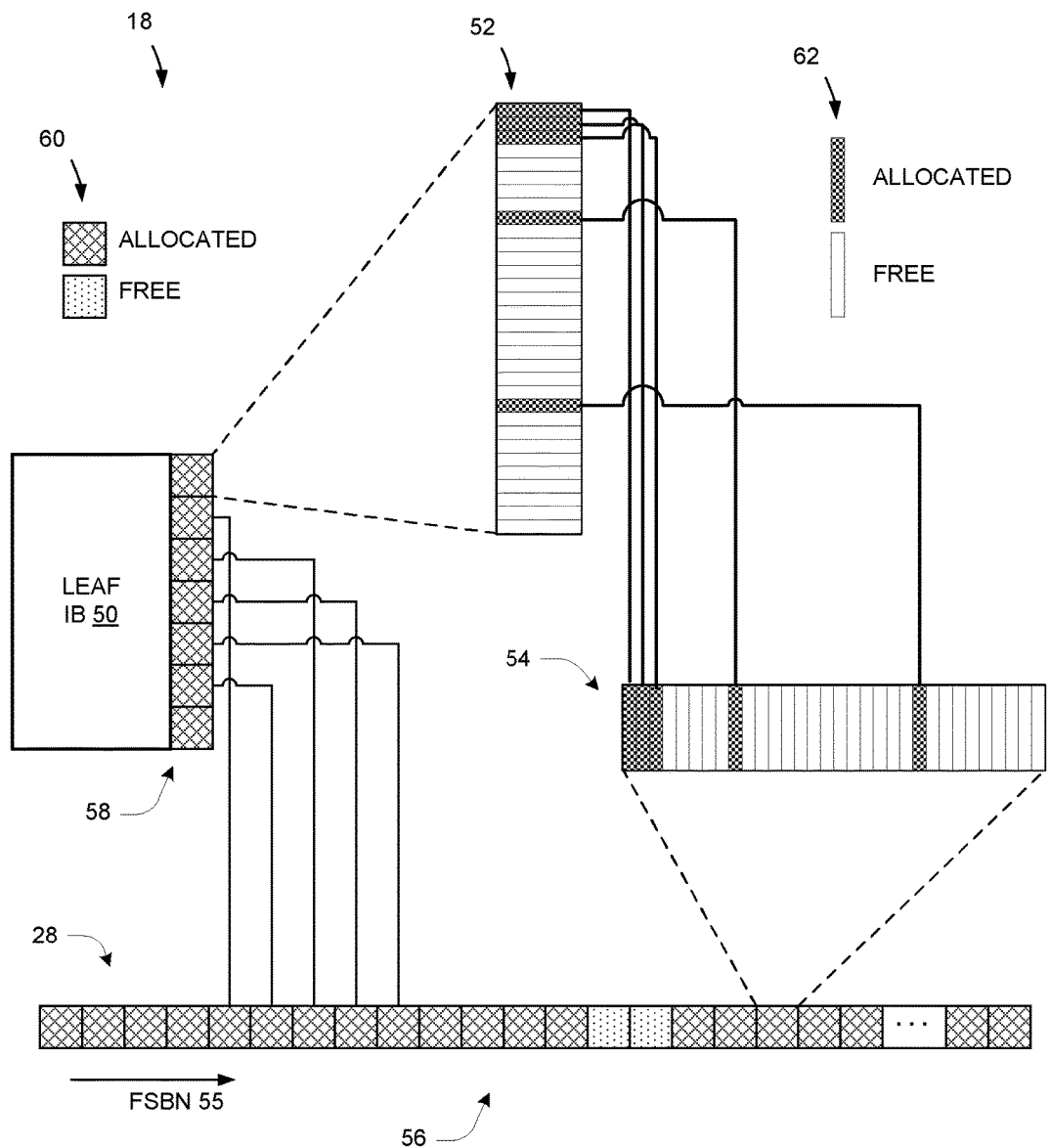
FIG. 3 is a schematic diagram of a portion of a file system.

FIG. 3 is a schematic view of part of the structure of the file system 18 as stored on the volume 28. As generally known, the file system 18 includes multi-level pointer structures that map individual files to respective areas of the volume 28 where the data of the file data resides. In UNIX-type file systems, for example, a file is represented by a so-called inode and up to three levels of "indirect blocks" or IBs, each containing pointers to data blocks on the volume 28 that constitute the file. Shown in FIG. 3 is a representative IB, shown as a "leaf" IB 50, for part of a file. The term "leaf" signifies its outermost location in the tree-like IB structure. As described herein, in some embodiments certain information used for window allocation is maintained in leaf IBs, although in other embodiments allocation-related information may be stored and used in other ways.

The leaf IB 50 includes an array of block pointers, examples of which are indicated at 52, each pointing to a corresponding block 54 of the volume 28. As shown, the volume 28 is organized as a linear array of blocks 54 with sequential file system block numbers (FSBN) 55. There is a relationship between the block size, volume size (address length), and number of pointers per leaf IB. In one example, the block size is 8 KB and each leaf IB stores 1,024 (1 K) block pointers along with other data as described more below. Thus a single leaf IB 50 maps 8 MB of space (1 K blocks each of size 8 KB). A file is a linear array of bytes at corresponding "offset" addresses. Different parts of the offset address are used to (1) traverse the tree-like structure of IBs to identify an individual leaf IB 50, (2) identify a particular block pointer 52 by its offset within the leaf IB 50, and (3) identify a byte within the block 54 identified by the block pointer 52.

In support of window-based allocation, the volume 28 is viewed as a sequence of fixed-size windows 56 each having a certain number of blocks 54. In one example, each window 56 is 512 KB in size and thus includes sixty-four 8 K blocks 54. In some embodiments the window size may be equal to the stripe size of underlying RAID groups defined across sets of storage devices 16. Typically both the windows 56 and blocks 54 are naturally aligned within the address space of the volume 28. The windows 56 of the volume 28 are also referred to herein as "physical" windows 56 to distinguish them from a separate "logical" view from the perspective of a file and the leaf IB 50. Thus as used herein, "logical window" 58 refers to a window-size unit of data as identified by an offset into a file and a leaf IB 50, while "physical window" 56 refers to such window-size unit of data as identified by a volume-referenced address, i.e., the FSBN 55 divided by 64 in the illustrated embodiment.

Also shown in FIG. 3 are legends 60, 62 for allocation status of windows 56, 58 and blocks 52, 54. Each can have a status of "allocated" or "free" as shown.

Figure 4:
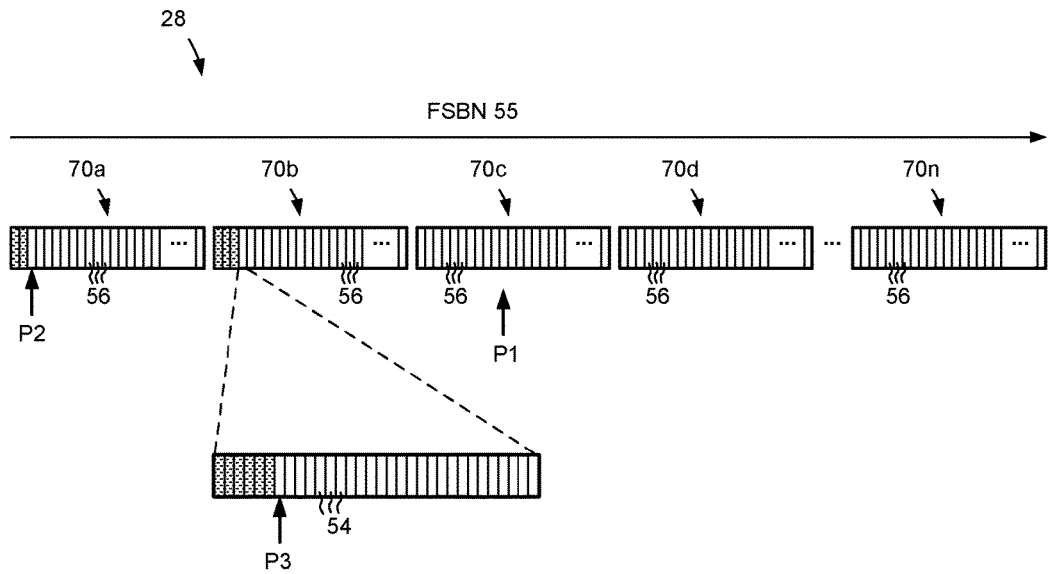
FIG. 4 is a schematic diagram depicting use of allocation pointers.

FIG. 4 shows volume 28 as having multiple regions 70a to 70n. Each of the regions 70a to 70n covers a respective range of sequential physical addresses in the physical address space and may represent a large extent of storage space. Each of the regions 70a to 70n includes multiple windows 56, and each window 56 covers a range of sequential physical addresses smaller than the region 70 that contains it. In one example, the regions 70a to 70n are equal in size to one another and the windows 56 within all regions 70a to 70n are equal in size. In a particular implementation, each of the regions 70a to 70n corresponds to a respective cylinder group (CG) of the volume 28. Each CG may support 256 MB of storage, for example.

The region and window structuring of the volume 28 supports both sequential and non-sequential data. As indicated above, space is allocated in units of windows 56 for sequential data. For non-sequential data, space is allocated in units of blocks. For purposes of allocating space to store data, a set of three pointers shown in FIG. 4 are used as follows:

P1—next region 70
P2—next window 56
P3—next block 54

Whenever one entire region 70 has become fully allocated, the next region 70 to be allocated is the one identified by the value of the next region pointer P1. Each region 70 may be assigned wholly for sequential data or wholly for non-sequential data. Thus if allocation is being performed for sequential data when a new region 70 is allocated, then the new region 70 will be used only for sequential data. If allocation is being performed for non-sequential data when a new region 70 is allocated, then the new region 70 will be used only for non-sequential data.

For allocation of windows 56 and blocks 54, at any given time the next window pointer P2 points to a next free window 56 in a sequential-type region 70 (e.g., region 70a), and the next block pointer P3 points to a next free block 54 in a non-sequential-type region 70 (e.g., region 70b). When a new window 56 is to be allocated for sequential data, the window 56 pointed to by the next window pointer P2 is the one allocated, and the pointer P2 is then advanced. When a new block 54 is to be allocated for non-sequential data, the block 54 pointed to by the next block pointer P3 is the one allocated, and the pointer P3 is then advanced.

More specifically for sequential data, the window allocation logic 38 (FIG. 1) allocates storage for sequential data in a window-by-window fashion, with the next window pointer P2 advancing to a next free window 56 each time a new window is allocated. Once sequential allocation reaches the last free window 56 in a region (e.g., region 70a), a new region 70 is then allocated (e.g., region 70c) using the next region pointer P1. Window-by-window allocation then continues within the new region 70 using the next window pointer P2.

For non-sequential data, the allocation logic 38 allocates on a block-by-block basis through the window 56 containing the block 54 pointed to by the next block pointer P3. This effects a packing of non-sequential data into such window 56. Once the current window 56 is filled, the next block pointer P3 advances to the next free window 56 in the same region (e.g., region 70b), and the allocation logic 38 continues block-by-block allocation from there. Once an entire region 70 (e.g., region 70b) is filled with non-sequential data blocks 54, the allocation logic 38 advances the next block pointer P3 to the next free region 70, e.g., to region 70d, from which block-by-block allocation continues. Additional information about window-based allocation can be found in copending U.S. application Ser. No. 14/674,389, filed Mar. 31, 2015, the contents and teachings of which are incorporated herein by reference in their entirety.

The above description applies to the contents of the volume 28 generally, both as stored on underlying storage devices 16 and when occupying a cache as described above. With window-based storage, it may be sensible to consider window fullness as a factor in the flushing or destaging of cache data to the storage devices 16. Ideally only full windows 56 are destaged, especially when they correspond to stripes of a RAID group as mentioned above. In this case, flushing an individual window 56 induces an efficient, full-stripe write, including parity, without requiring an initial read operation to obtain the portion of a stripe not being written as well as to recalculate parity. To promote fullness of windows 56, data may be "coalesced". Additional information about coalescing data within windows to promote full-stripe writes can be found in copending U.S. application Ser. No. 14/576,952, filed Dec. 19, 2014, the contents and teachings of which are incorporated herein by reference in their entirety.

As mentioned, it may be preferable that each region 70 store either sequential data or non-sequential data. It has been observed that many activities performed in data storage system, such as caching, copying, and backup, operate more efficiently on long segments of sequential data extending over many consecutive windows 56 than they do on shorter segments extending over a smaller number of windows 56. Thus to promote such long segments, the allocation logic 38 may avoid placing the pointers P2, P3 in the same region 70. Segregating sequential and non-sequential data across different regions 70 improves the likelihood that long sequential writes can be achieved. However, in some embodiments this condition may either not exist at all or it may be selectively relaxed as conditions warrant. As an example, a system may use the above approach of segregating sequential and non-sequential data into different regions 70, but relax this requirement when the file system becomes very full or under other extreme conditions.

Figure 5:
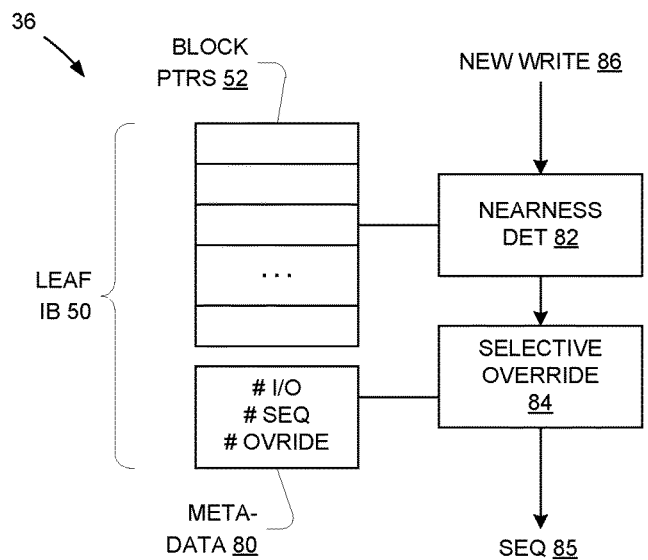
FIG. 5 is a block diagram of stream detection logic.

FIG. 5 shows the stream detection logic 36 including related structure of the leaf IB 50, namely the block pointers (BLOCK PTRS) 52 as well as certain metadata 80 to be described. The stream detection logic 36 includes nearness detection (NEARNESS DET) logic 82 and selective override logic 84, both coupled to the leaf IB 50 to access its contents for operation. The stream detection logic 36 outputs a signal shown as SEQ 85 providing an indication whether data being written is sequential data.

At a high level, sequential data is detected by the nearness detection logic 82 determining whether a new write 86 is directed to a block that is sufficiently "near" (i.e., having a nearby block address) to a previously written data block for which there is a block pointer 52 in the leaf IB 50. It should be noted that the leaf IB 50 of interest will have been identified by the corresponding portion of the file offset to which the new write 86 is directed. A block is considered "near" another if their respective offsets are within a predetermined small range of each other. If a symmetric range is used, it can be specified by one number which can be viewed as a threshold. In one example a threshold of 4 is used, corresponding to a range of {−4, +4}. Thus if a previously written block has an offset of 4022, for example, then a new block with an offset of 4020 is considered near and a new block having an offset of 4016 is not considered near. It is anticipated that in many cases an effective nearness threshold may be less than 10, for example.

Use of a nearness threshold of this type can work well at identifying sequential data being written in a single stream, e.g., by a single execution thread writing to a file. However, it can break down and work poorly when sequential data is being written by a set of multiple execution threads operating in parallel on different parts of a sequential stream. In particular it may be problematic when the threshold value is less than the number of concurrent execution threads writing the sequential data blocks. In that case, writes may be received and performed out of address order, so that for some writes the nearness threshold may not be met only because other writes for nearby data blocks (by other threads) have not yet occurred. Thus, write data that should be identified as sequential and included in a particular window 56 may be identified as non-sequential or may cause allocation of a separate window 56, both of which are sub-optimal outcomes.

Thus one aspect of the stream detection logic 36 is a selective override function provided by selective override logic 84. Generally, this logic looks for a pattern in the data being written to an area of a file covered by a leaf IB 50 indicating that data may be sequential, and when such a pattern exists then "overriding" the nearness detection logic 82 by independently generating an indication of sequentiality. For this purpose, the leaf IB 50 stores metadata 80 including running counts for the following:

I/O—count of total data blocks written
SEQ—count of data blocks identified as sequential by the nearness detection logic 82
OVRIDE—count of "overrides"—see below Details of operation of the stream detection logic 36 including selective overriding are provided further below.

Figure 6:
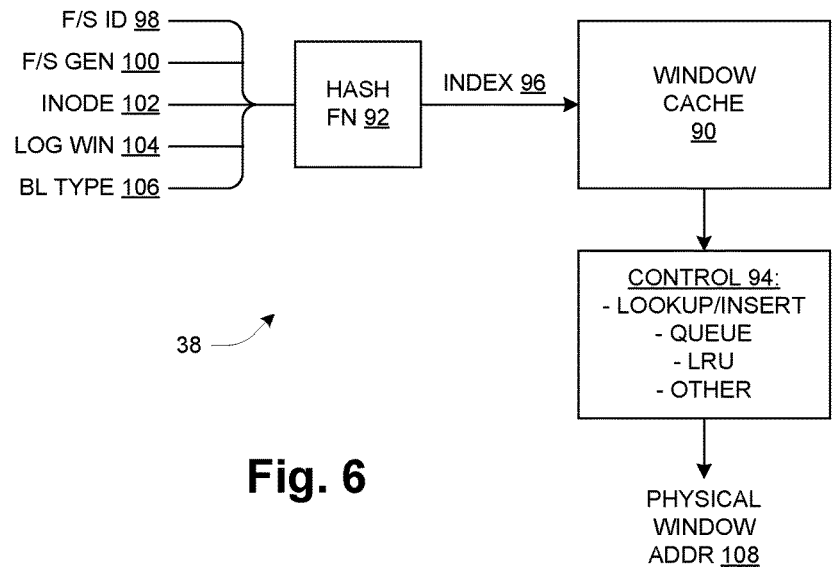
FIG. 6 is a block diagram of window allocation logic.

FIG. 6 shows the window allocation logic 38. Generally, this logic is responsible for (1) allocating new windows 56 and blocks 54 for storing sequential and non-sequential data as described above, and (2) for sequential data, identifying an existing (previously allocated) window 56 that should be used to store newly written data, if an appropriate window exists.

Before describing more detailed structure and operation of the window allocation logic, there is a brief description of certain operating scenarios and challenges to be met. Both sequential-data window allocation as well as other operations can potentially encounter circumstances in which when a correct window preference is not returned. These might include the following:

Several sequential I/Os for the same stream hit the same window at the same time. These I/Os may not arrive in LBA order.
Stream detection may categorize a first I/O in a sequential stream as random and subsequent I/Os in that stream as sequential. This can cause an entry in the leaf IB 50 to have a block or VBM address in non-sequential space.
The write logic may be designed to process a second I/O in a sequential stream so that it does not look in the leaf IB for a preference, but requests a new window in sequential space, and then for all subsequent I/Os look in the leaf IB for a preferred block/VBM.
Out of order LBA can cause the lookbehind/lookahead algorithm to encounter a non-sequential entry before a sequential entry. In this case the non-sequential entry will be returned.
In a remapping operation to fix fragmentation, the first I/O to a given window may not fall at the start of the window. For the out of order LBA, subsequent sequential I/Os may not be able to determine which of the values in the leaf IB represent VBMs/blocks from the new window.
Also for remapping, it is necessary to know which window is being remapped and to correctly find the value of the new window, otherwise there may be inadequate fixing of fragmentation. The window information must persist across multiple operations that may rely on the information.
In the case of threads racing to allocate a new window in a leaf IB, there may not be any synchronization amongst the threads, and so more than one window may be allocated thus contributing to fragmentation.

In the above cases a window preference might exist, but it may not refer to the new sequential window that is actually preferred for use for the remaining sequential allocations. Also as noted, there may be unnecessary allocation of multiple windows that can contribute to fragmentation.

To address the above issues and as shown in FIG. 6, the window allocation logic 38 employs a data structure referred to as a window cache 90 as well as a hash function 92 and control logic 94. At a high level, this logic operates to maintain and provide hints to help ensure that windows 56 are used fully and that new windows 56 are allocated only when actually needed. The window cache 90 stores window hints for all file systems (including file system 18) and all LUNs of the data storage system 12. It generally includes only a limited number of entries to keep its memory footprint small. It can use a replacement mechanism such as least recently used (LRU) to age out entries which are no longer needed. Its size may be selected to provide some number of entries per LUN and some maximum number of LUNs to be supported. The size may be configurable to support different deployment scenarios.

The hash function 92 generates an index 96 for the window cache 90 from a key which is the combination of the following values:

1. A file system identifier (F/S ID) 98 of a file system 18
2. A file system generation number (F/S GEN) 100 for the identified file system
3. An inode number (INODE) 102 for a file of the file system
4. A logical window address (LOG WIN) 104 for a window area of the file
5. A block type (BL TYPE) 106

The block type 106 may be useful when the file system 18 supports multiple block referencing schemes. Conventionally, the block pointers 52 point directly to respective data blocks 54 containing the data of the file. In an alternative arrangement, there may be a layer of indirection used between the leaf IB 50 and the data blocks 54. Indirection may be realized using so-called "virtual block mapping" or VBM, in which the pointers 52 point to intermediate VBM structures that contain pointers for the underlying data blocks 54. VBM structuring can be useful in supporting certain types of storage services provided by a data storage system 12.

Generally in connection with a write data operation, and under control of the control logic 94, an index value 96 is calculated by the hash function 92 using operation-specific values of the key variables 98-106, and a corresponding entry is retrieved from the window cache 90. If there is a valid entry, it is used to generate a physical window address 108 identifying an existing physical window 56 where the write data should be written. Retrieval uses an atomic lookup/insert operation that both retrieves the contents stored at the index location and, if necessary, inserts a new entry that reflects a new allocation. Details of this operation are described below. As indicated, the control logic 94 also includes and manages a queue of pending operations, LRU replacement of entries of the window cache 90, and other operations as also described further below.

Figure 7:
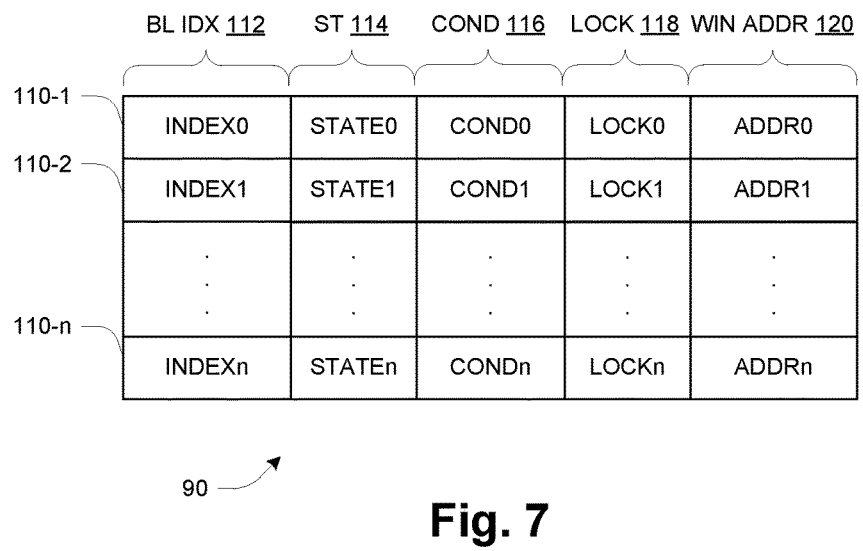
FIG. 7 is a schematic diagram of a window cache.

FIG. 7 shows the structure of the window cache 90. It includes an array of entries 110 (110-1, 110-2, . . . , 110-*n* as shown), each having data values of a set of fields including a block index (BL IDX) field 112, state (ST) field 114, condition (COND) field 116, spin lock (LOCK) field 118, and window address (WIN ADDR) field 120. These are described as follows:

BL IDX—Index within logical window where the allocated block/VBM exists.

ST—A value indicating operating state—Initializing, Valid, NO Window, Invalid

COND—Condition variable for synchronizing allocation operations

LOCK—Spin lock for synchronizing accesses/updates to the entry

WIN ADDR—Address of physical window

The use of the above contents of the window cache 90 is described below. With respect to the block index 112, an alternative arrangement in a mixed block/VBM implementation is to store the location of the data block window for data block entries to avoid the need for a VBM cache lookup to obtain a VBM entry to retrieve the block information.

Figure 8:
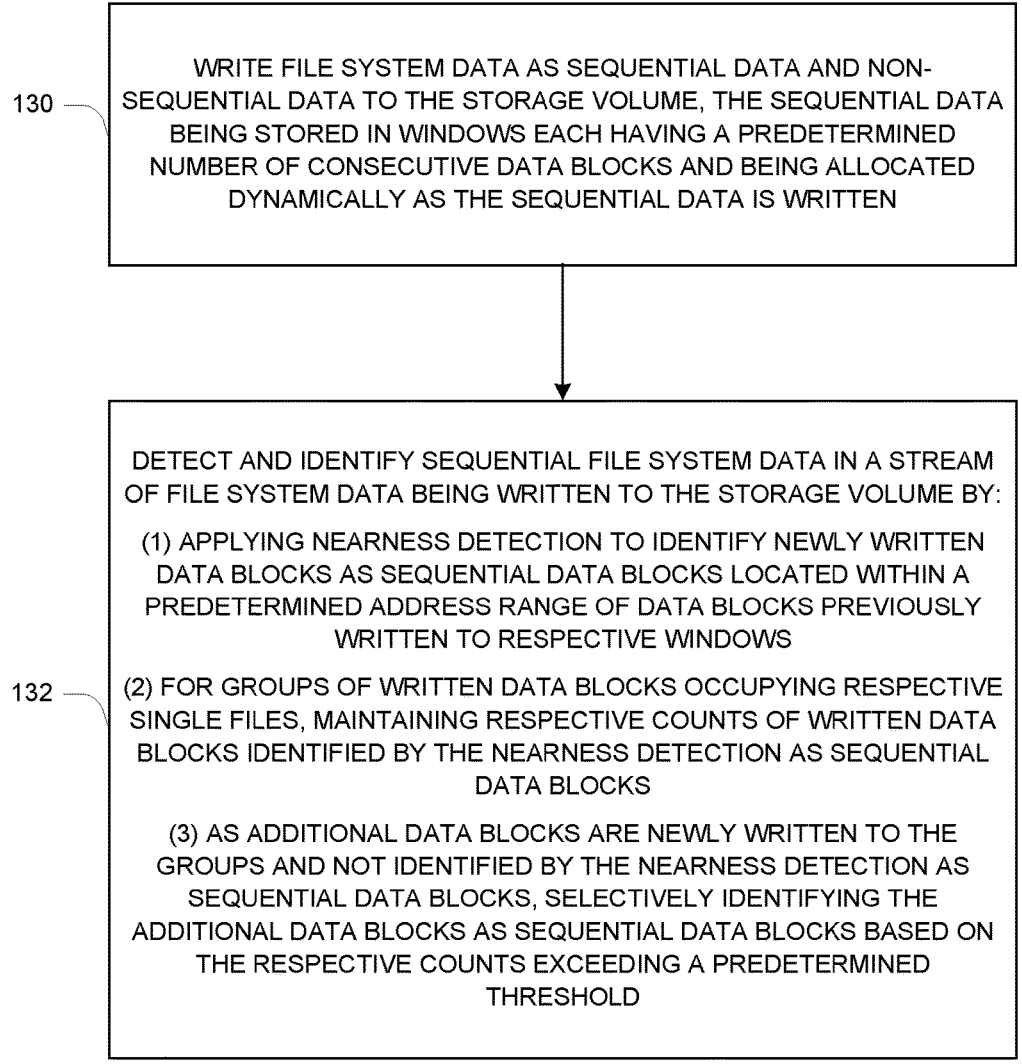
FIG. 8 is a flow diagram of stream detection operation.

FIG. 8 is a high-level flow of operation with respect to stream detection in particular, including operation of the stream detection logic 36 as described above with reference to FIG. 5.

At 130, file system data is written as sequential data and non-sequential data to a storage volume (e.g., volume 28), the sequential data being stored in windows (e.g., windows 56) each having a predetermined number of consecutive data blocks and being allocated dynamically as the sequential data is written.

At 132, operation includes detecting and identifying the sequential file system data in a stream of file system data being written to the storage volume. This includes (1) applying nearness detection (e.g., using nearness detection logic 82) to identify newly written data blocks as sequential data blocks located within a predetermined address range of data blocks previously written to respective windows, (2) for groups of written data blocks occupying respective single files (e.g., referenced by an individual leaf IB 50), maintaining respective counts (e.g., as metadata 80) of the respective written data blocks identified by the nearness detection as sequential data blocks, and (3) as additional data blocks are newly written to the groups and not identified by the nearness detection as sequential data blocks, selectively identifying (e.g., using selective override logic 84) the additional data blocks as sequential data blocks based on the respective counts exceeding a predetermined threshold.

In general, the approach involves a more dynamic tracking of I/O requests with feedback to allow sequentiality detection to adapt to changes in the workload. Operation at 132 effects a delay in switching to a "non-sequential" indication until there is more definitive evidence that the workload is indeed non-sequential.

As mentioned, in operation the number of I/Os determined to be sequential by the nearness detection logic 82 is tracked using the # SEQ count. If a new I/O (new write 86) is categorized as non-sequential, i.e., not sufficiently "near" any previously written data blocks of the leaf IB 50, then the override logic 84 uses # SEQ count to determine if the recent history of the workload in this leaf IB 50 has been mostly sequential. This may be indicated by calculating the ratio (# SEQ)/(# I/O) and comparing it with a threshold, which may be configurable. If the ratio exceeds the threshold, it indicates that the workload has been mostly sequential, and the new I/O 86 is categorized as sequential on that basis.

It will be appreciated that the above can be viewed as an "override" of the non-sequential indication provided by the nearness detection logic 82. In many cases the override will be justified and improve performance by keeping sequential writes together in one window 56, notwithstanding that they may be written out-of-order by multiple execution threads. However, in some cases the data may truly be non-sequential and thus should not occupy a sequential window 56. To account for this possibility, the # OVRIDE count is used. It is incremented when each override occurs. If the number of overrides reaches a limit, then it is concluded that the workload is actually non-sequential and further overriding is disabled for the data blocks of this leaf IB 50. This override limit may also be configurable.

The # I/O, # SEQ and # OVRIDE counters may generally be free-running, although they may also be resettable. If one of the counters rolls over (i.e., increments from its maximum value back to zero), then the remaining counters may be reset with values that maintain the ratio of the historic I/O types (sequential or non-sequential).

The above operation can help make allocation more adaptable to changes in workload and reduce the number of extra windows 56 allocated needlessly.

Figure 9:
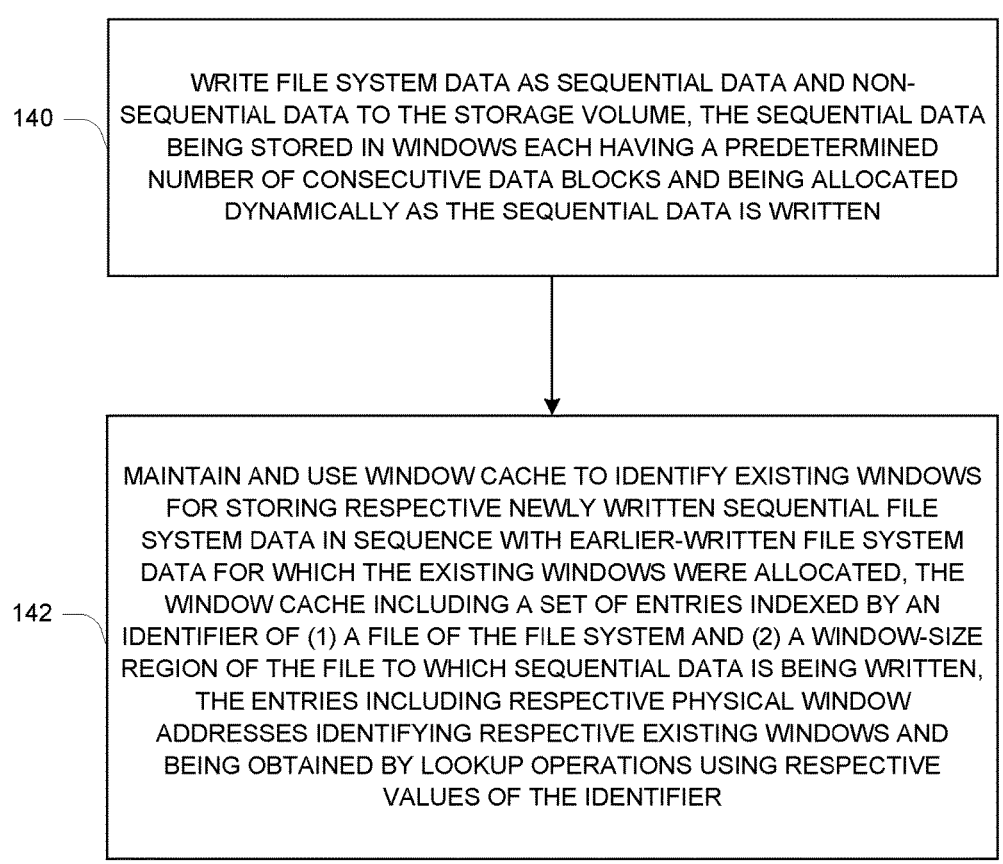
FIG. 9 is a flow diagram of window allocation operation.

FIG. 9 is a high-level flow of operation with respect to window allocation for sequential data, including operation of the window allocation logic 38 as described above with reference to FIGS. 6-7.

At 140, file system data is written as sequential data and non-sequential data to a storage volume (e.g., volume 28), the sequential data being stored in windows (e.g., windows 56) each having a predetermined number of consecutive data blocks and being allocated dynamically as the sequential data is written.

At 142, operation includes maintaining and using a window cache (e.g., window cache 90) to identify existing windows for storing respective newly written sequential file system data in sequence with respective earlier-written file system data for which the existing windows were previously allocated. The window cache includes a set of entries (e.g., entries 110) indexed by an identifier (e.g., index 96) of (1) a file of the file system and (2) a window-size region (e.g., logical window 58) of the file to which sequential data is being written. The entries include respective physical window addresses (e.g., window addresses 120) identifying respective ones of the existing windows and being obtained by lookup operations using respective values of the identifier.

In general, the approach involves storing and using "hints" to identify the correct window 56 to be used for an I/O, as outlined above. In operation at 142, when an I/O arrives and it is categorized as sequential (either by nearness or override) the following steps are executed:

1. An atomic lookup/insert in the window cache 90 to locate the window information is performed. The lookup key includes the logical window identifier 104 of the area of the file being written to.

2. If a valid entry 110 exists for the logical window, then the block or VBM information cached there is returned. The block preference is adjusted according to the offset within the logical window.

3. If an entry 110 does not exist for that logical window, then a new entry is inserted and its state set to Initializing.

4. If an entry 110 exists but it is in the state Initializing, then this allocation blocks (i.e., it is idled and queued for later restart) on the condition variable 16.

5. If an entry 110 is being initialized, once its underlying physical storage is identified then the block or VBM information is filled in and any previously blocked allocation operations are awoken to permit them to proceed.

The above causes new lookups to await completion of any in-progress allocations. This ensures that the contents of the window cache 90 are as complete and accurate as possible for each lookup, improving accuracy of the identification of existing windows 56 that can be used and reducing the unnecessary allocation of new windows 56.

As mentioned above, the control logic 94 (FIG. 6) also controls other aspects of operation under certain circumstances. Examples are as follows:

1. Out of Window Situation

If the system runs out of windows 56, the window value stored in the window cache 90 may refer to a window whose space has been consumed. In this case it may not be possible to allocate in this window and instead another location will be found. In this case it may be desired to stop using this cached window information. Options in this case include:

Update the information in the entry to reflect the new index/block

Remove the entry from the window cache 90 and place it at the head of the replacement LRU. Notify any threads waiting on condition variable.

Mark entry as NO window and place at head of LRU. Notify any threads waiting on condition variable.

2. Block Relocation

If a block is in the window cache 90 and being relocated, options include:

Purging the block from the cache.

Checking whether the block/VBM preference refers to provisioned storage. If not, the entry is deleted.

3. Purge

The window cache 90 may be purged under the following circumstances:

Lazy purge after remount using F/S ID

When a LUN is deleted its related entries are purged (possibly using lazy purge)

4. Remap

When remapping data and VBM blocks to fix fragmentation in a region, the remapping code may look in the window cache 90 for an entry similar to what the normal I/O code would do for a new window allocation. The code may set allocation policy/preference based on whether it finds a valid entry in the window cache 90.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to write file system data of an internal file system to an underlying storage volume, comprising:

writing the file system data as sequential data and non-sequential data to the storage volume, the sequential data being stored in windows each having a predetermined number of consecutive data blocks and being allocated dynamically as the sequential data is written; and detecting and identifying the sequential data in a stream of file system data being written to the storage volume by (1) applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

2. The method of claim 1, wherein the predetermined address range is defined by a threshold nearness value less than a number of concurrent execution threads writing the sequential data blocks.

3. The method of claim 2, wherein the threshold nearness value is less than 10.

4. The method of claim 1, wherein the predetermined threshold is a predetermined ratio of (1) a count of written data blocks identified by the nearness detection as sequential data blocks and (2) a count of total written data blocks.

5. The method of claim 1, further including:

for the groups of written data blocks, maintaining respective counts of overrides that have been performed; and for subsequent written data blocks, refraining from performing additional overrides based on the respective counts of overrides exceeding a predetermined override limit.

6. The method of claim 5, wherein the counts of overrides are stored in respective leaf indirect blocks of respective files of the file system.

7. The method of claim 1, wherein the files of the file system store respective host storage objects selected from a block-type object and a file-type object.

8. The method of claim 7, wherein the host storage objects include respective images for virtual computing components selected from virtual machines and virtual desktops.

9. The method of claim 1, wherein the sequential data is being written by a set of multiple execution threads operating in parallel on different parts of a sequential stream and data blocks are written sufficiently out of address order that the nearness threshold is not met for some writes only because other writes by other execution threads have not yet occurred.

10. The method of claim 1, wherein the windows are sub-units of larger contiguous regions, each region being used for only sequential data or for only non-sequential data.

11. A data storage system including processing circuitry, physical storage devices, and interface circuitry coupling the processing circuitry to the physical storage devices, the processing circuitry storing and executing computer program instructions to cause the data storage system to realize a storage volume and associated internal file system, the storage volume realized using physical storage of the physical storage devices, the file system being configured and operative to:

write file system data as sequential data and non-sequential data to the storage volume, the sequential data being stored in windows each having a predetermined number of consecutive data blocks and being allocated dynamically as the sequential data is written; and detect and identify the sequential data in a stream of file system data being written to the storage volume by (1) applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

12. The data storage system of claim 11, wherein the predetermined address range is defined by a threshold nearness value less than a number of concurrent execution threads writing the sequential data blocks.

13. The data storage system of claim 12, wherein the threshold nearness value is less than 10.

14. The data storage system of claim 11, wherein the predetermined threshold is a predetermined ratio of (1) a count of written data blocks identified by the nearness detection as sequential data blocks and (2) a count of total written data blocks.

15. The data storage system of claim 11, wherein the file system is further operative to:

for the groups of written data blocks, maintain respective counts of overrides that have been performed; and for subsequent written data blocks, refrain from performing additional overrides based on the respective counts of overrides exceeding a predetermined override limit.

16. The data storage system of claim 15, wherein the counts of overrides are stored in respective leaf indirect blocks of respective files of the file system.

17. The data storage system of claim 11, wherein the files of the file system store respective host storage objects selected from a block-type object and a file-type object.

18. The data storage system of claim 17, wherein the host storage objects include respective images for virtual computing components selected from virtual machines and virtual desktops.

19. The data storage system of claim 11, wherein the sequential data is being written by a set of multiple execution threads operating in parallel on different parts of a sequential stream and data blocks are written sufficiently out of address order that the nearness threshold is not met for some writes only because other writes by other execution threads have not yet occurred.

20. A non-transitory computer-readable storage medium storing computer program instructions, the instructions being executable by processing circuitry of a data storage system to cause the data storage system to perform a method of writing file system data of an internal file system to an underlying storage volume, by:

writing the file system data as sequential data and non-sequential data to the storage volume, the sequential data being stored in windows each having a predetermined number of consecutive data blocks and being allocated dynamically as the sequential data is written; and detecting and identifying the sequential data in a stream of file system data being written to the storage volume by (1) applying nearness detection to identify newly written data blocks as sequential data blocks located within a predetermined address range of data blocks previously written to respective windows, (2) for groups of written data blocks occupying respective single files, maintaining respective counts of the respective written data blocks identified by the nearness detection as sequential data blocks, and (3) as additional data blocks are newly written to the groups and not identified by the nearness detection as sequential data blocks, performing respective overrides identifying the additional data blocks as sequential data blocks based on the respective counts exceeding a predetermined threshold.

* * * * *